United States Patent
Meng et al.

(10) Patent No.: US 10,578,792 B2
(45) Date of Patent: Mar. 3, 2020

(54) LIGHT SOURCE MODULE WITH LIGHT MODULATING MEMBER AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Xiaochuan Chen, Beijing (CN); Jifeng Tan, Beijing (CN); Jian Gao, Beijing (CN); Xianqin Meng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/953,990

(22) Filed: Apr. 16, 2018

(65) Prior Publication Data
US 2019/0094445 A1    Mar. 28, 2019

(30) Foreign Application Priority Data
Sep. 27, 2017    (CN) .......................... 2017 1 0890451

(51) Int. Cl.
*F21V 8/00*    (2006.01)
*G02B 6/34*    (2006.01)

(52) U.S. Cl.
CPC ........... *G02B 6/0036* (2013.01); *G02B 6/005* (2013.01); *G02B 6/0016* (2013.01);
(Continued)

(58) Field of Classification Search
CPC .............. G02B 6/0016; G02B 6/0033; G02B 6/0035–0036; G02B 6/0091; G02B 6/34; G02B 26/0808; G02F 2001/133616
See application file for complete search history.

(56) References Cited

U.S. PATENT DOCUMENTS

| 9,645,304 B2 * | 5/2017 | Nichol | G02B 6/0028 |
| 2006/0007704 A1 * | 1/2006 | Mori | G02B 6/0013 |
| | | | 362/613 |

(Continued)

FOREIGN PATENT DOCUMENTS

| CN | 105074322 A | 11/2015 |
| CN | 106647042 A | 5/2017 |

(Continued)

OTHER PUBLICATIONS

Chinese Office Action in Chinese Application No. 201710890451.0, dated Mar. 29, 2019 with English translation.

*Primary Examiner* — Sean P Gramling
*Assistant Examiner* — Keith G. Delahoussaye
(74) *Attorney, Agent, or Firm* — Collard & Roe, P.C.

(57) ABSTRACT

A light source module includes a light guide member, a light exiting member, a first collimating light source, and a first light modulating member. The light guide member includes a first surface and a second surface disposed opposite to the first surface, the first surface is configured as a light exiting surface and comprise a light exiting region; the light exiting member is disposed on the first surface in the light exiting region; the first collimating light source is configured to provide a first collimated light; and the first light modulating member is disposed on one of the first surface and the second surface and configured to change a transmission direction of the first collimated light so as to make it incident into the light guide member and make at least part of the first collimated light meet a total reflection condition of the light guide member.

16 Claims, 10 Drawing Sheets

(52) U.S. Cl.
CPC ......... *G02B 6/0023* (2013.01); *G02B 6/0055* (2013.01); *G02B 6/0068* (2013.01); *G02B 6/0091* (2013.01); *G02B 6/003* (2013.01); *G02B 6/34* (2013.01)

(56) References Cited

U.S. PATENT DOCUMENTS

| | | | |
|---|---|---|---|
| 2008/0043334 A1* | 2/2008 | Itzkovitch | G02B 5/1814 359/569 |
| 2015/0185393 A1* | 7/2015 | Bang | G02B 6/0023 362/608 |
| 2016/0018582 A1 | 1/2016 | Fiorentino et al. | |
| 2018/0165497 A1* | 6/2018 | Lee | G06F 3/0412 |

FOREIGN PATENT DOCUMENTS

| | | |
|---|---|---|
| CN | 107167920 A | 9/2017 |
| WO | 2017/083160 A1 | 5/2017 |

\* cited by examiner

LIGHT SOURCE MODULE WITH LIGHT MODULATING MEMBER AND DISPLAY DEVICE

The present application claims priority of Chinese Patent Application No. 201710890451.0 filed on Sep. 27, 2017, the disclosure of which is hereby entirely incorporated by reference as a portion of the present application.

TECHNICAL FIELD

Embodiments of the present disclosure relate to a light source module and a display device.

BACKGROUND

Light source modules are widely used in display devices, such as TVs, laptop computers, PDAs, mobile phones and the like. Based on the relative positions between a light source module and a display panel, the display devices can be categorized into a front backlight display device and a rear backlight display device. For the front backlight display device, the light source module is closer to the user than the display panel, and for the rear backlight display device, the display panel is closer to the user than the light source module.

SUMMARY

At least one embodiment of the present disclosure provides a light source module, which comprises a light guide member, a light exiting member, a first collimating light source, and a first light modulating member, the light guide member comprising a first surface and a second surface disposed opposite to the first surface, the first surface configured as a light exiting surface and comprising a light exiting region, the light exiting member disposed on the first surface in the light exiting region, the first collimating light source configured to provide a first collimated light, and the first light modulating member disposed on one of the first surface and the second surface and configured to change a transmission direction of the first collimated light to be incident into the light guide member such that at least a portion of the first collimated light meets a total reflection condition of the light guide member.

For example, in the light source module according to at least one embodiment of the present disclosure, the first collimated light is perpendicularly incident on the first light modulating member.

For example, in the light source module according to at least one embodiment of the present disclosure, the first light modulating member is disposed on the second surface; and the first light modulating member is one of a volume grating, a step grating and a reflective modulating structure array.

For example, in the light source module according to at least one embodiment of the present disclosure, a width L of the first light modulating member in a first direction is greater than or equal to $2h \times \tan\theta$, wherein $\theta$ is an included angle between a transmission direction of the light in the light guide member and a normal direction of the first surface, and h is a thickness of the light guide member in a direction perpendicular to the first surface.

For example, in the light source module according to at least one embodiment of the present disclosure, the light source module further comprises a second light modulating member, wherein the second light modulating member is disposed on the first surface and disposed opposite to the first light modulating member; and the second light modulating member is at least one of a volume grating, a step grating, a blazed grating and a reflective modulating structure array.

For example, in the light source module according to at least one embodiment of the present disclosure, a width L of the first light modulating member in a first direction is greater than or equal to $h \times \tan\theta$, a width L1 of the second light modulating member in the first direction is greater than or equal to $h \times \tan\theta$, wherein $\theta$ is an included angle between a transmission direction of the light in the light guide member and a normal direction of the first surface, and h is a thickness of the light guide member in a direction perpendicular to the first surface.

For example, in the light source module according to at least one embodiment of the present disclosure, the first light modulating member is configured to divide the first collimated light incident thereon into a first modulated light of which transmission direction is constant and second modulated light of which transmission direction is changed, intensity of the first modulated light being equal to intensity of the second modulated light.

For example, in the light source module according to at least one embodiment of the present disclosure, the first light modulating member is disposed on the first surface, a width L of the first light modulating member in a first direction is greater than or equal to $2h \times \tan\theta$, wherein $\theta$ is an included angle between a transmission direction of light in the light guide member and the normal direction of the first surface, and h is a thickness of the light guide member in a direction perpendicular to the first surface; and the first light modulating member is at least one of a volume grating, a step grating, a blazed grating and a reflective modulating structure array.

For example, in the light source module according to at least one embodiment of the present disclosure, the first collimated light emitted by the first collimating light source is a stripe light source.

For example, in the light source module according to at least one embodiment of the present disclosure, the light exiting member is provided with a plurality of grating sub-structures disposed at intervals in the first direction.

For example, in the light source module according to at least one embodiment of the present disclosure, each of the grating sub-structures comprises a first grating bar extending in a second direction or a plurality of second grating bars spaced apart in the second direction, the second direction being perpendicular to the first direction.

For example, in the light source module according to at least one embodiment of the present disclosure, the light source module further comprises a reflective member, the light guide member further comprises a first side surface and a second side surface, the first side surface and the second side surface are perpendicular to the first surface and are disposed opposite to each other in the first direction, and the reflective member is disposed on at least one of the first side surface and the second side surface and is configured to reflect light incident thereon back to the light guide member.

For example, in the light source module according to at least one embodiment of the present disclosure, the light source module further comprises a third light modulating member and a second collimating light source, the second collimating light source is configured to provide a second collimated light, the third light modulating member is disposed on one of the first surface and the second surfaces and configured to change a transmission direction of the second collimated light to be incident into the light guide member and to make at least a portion of the second collimated light meet a total reflection condition of the light guide member; an orthogonal projection of the first light modulating member on the first surface is a first rectangle, an orthographic projection of the third light modulating member on the first surface is a second rectangle, and the first rectangle and the second rectangle are respectively located at two ends of the first surface in the first direction.

For example, in the light source module according to at least one embodiment of the present disclosure, the light source module further comprises a first substrate and a second substrate, wherein the first substrate is disposed on the light exiting member; and the second substrate is disposed on a side of the light guide member away from the light exiting member; each of a refractive index of the first substrate and a refractive index of the second substrate is less than a refractive index of the light guide member.

For example, in the light source module according to at least one embodiment of the present disclosure, a thickness of the light guide member in a direction perpendicular to the first surface is in a range of 1 μm to 90 μm; and a refractive index of the light exiting member is identical to a refractive index of the light guide member.

At least one embodiment of the present disclosure further provides a display device, comprising a light source module according to any one embodiment of the present disclosure.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless defined otherwise, technical and scientific terms used in the present disclosure should have the same meaning as commonly understood by one of ordinary skill in the art to which this disclosure belongs. The terms "first," "second," and similar terms used in the present disclosure do not denote any order, quantity or importance, but merely serve to distinguish different components. The use of "including" or "comprising" and the like means that the element or article preceding the word covers elements or items that appear after the word and their equivalents, but do not exclude other elements or items. The words "connection" or "connected" and the like are not limited to physical or mechanical connections but may include electrical connections, whether direct or indirect. "Up," "Down," "Left," "Right," and the like are used only to indicate a relative positional relationship, and the relative positional relationship may also change correspondingly when the absolute positions of the described objects are changed.

Figure 9:
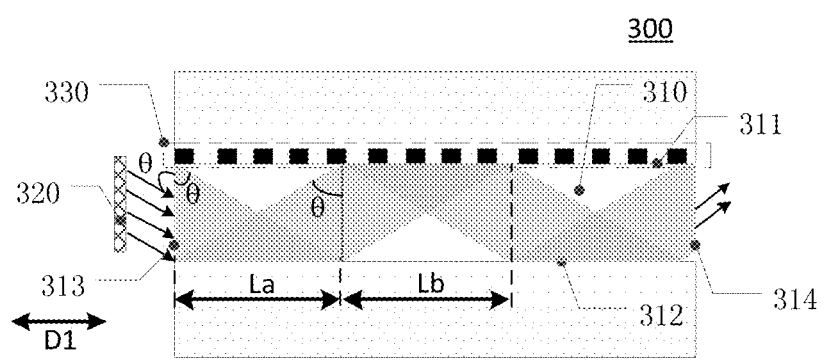
FIG. 9 is a schematic cross-sectional view of a light source module.

FIG. 9 is a schematic cross-sectional view of a light source module 300. For example, as illustrated in FIG. 9, the light source module 300 comprises a light guide member 310, a collimating light source 320 and a light exiting member 330. For example, the light guide member 310 comprises a first surface 311, a second surface 312, a first side surface 313 and a second side surface 314. For example, the light exiting member 330 may be a light exiting grating that diffracts the light incident thereon (i.e., the light in the light guide member 310) out of the light guide member 310. For example, the collimating light source 320 may be configured to provide collimated light. For example, the collimated light emitted by the collimating light source 320 may be obliquely incident on the first side surface 313 (the angle between the collimated light and the first side surface 313 is θ), and the obliquely incident light may enter the light guide member 310 via the first side surface 313 and is transmitted from the left to the right in the light guide member 310 (i.e., from the first side surface 313 to the second side surface 314). For example, during the transmission of the light from the left to the right, a part of light is guided out of the light guide member 310 through the first surface 311.

The inventor noticed that there are alternately bright areas and dark areas on the first surface 311 in the first direction D1. Therefore, the light source module illustrated in FIG. 9 can not achieve uniform light output, which deviates from the requirement that the light source module 300 provides a uniform planar light source. For example, there is light in the bright areas and no light in the dark areas. For example, a width of the light area in the first direction D1 is Lb=h×tan θ; a width of the dark area in the first direction D1 is La=h×tan θ; here, h is a thickness of the light guide member 310 in a direction perpendicular to the first direction.

The inventor also noticed that a part of light incident on the light guide member 310 via the first side surface 313 can not be guided out of the light guide member 310 by the light exiting member 330 and finally exits the light guide member 310 via the second side surface 314, which reduces light utilization efficiency of the light source module 300 and increases energy consumption.

Embodiments of the present disclosure provide a light source module and a display device. By providing a first light modulating member, light emitted by a collimating light source included in the light source module can be incident on the light guide member via the first surface or the second surface.

At least one embodiment of the present disclosure provides a light source module. The light source module comprises a light guide member, a light exiting member, a first collimating light source, and a first light modulating member. The light guide member comprises a first surface and a second surface disposed opposite to the first surface, the first surface is configured as a light exiting surface and comprise a light exiting region; the light exiting member is disposed on the first surface in the light exiting region; the first collimating light source is configured to provide a first collimated light; a first light modulating member is disposed on one of the first surface and the second surface and configured to change a transmission direction of the first collimated light so as to make it incident into the light guide member and make at least part of the first collimated light meet a total reflection condition of the light guide member.

The light source module according to embodiments of the present disclosure will be described below through several embodiments.

First Embodiment

The embodiment provides a light source module 100. The light source module 100 can be configured to be a light source for a display device (for example, a front light source for a display device). For example, FIG. 1A and FIG. 1B respectively illustrate a schematic plan view and a cross-sectional view of the light source module 100 according to the first embodiment. FIG. 1B is a schematic cross-sectional view of the light source module 100 illustrated in FIG. 1A taken along line A-A'.

Figure 1A:
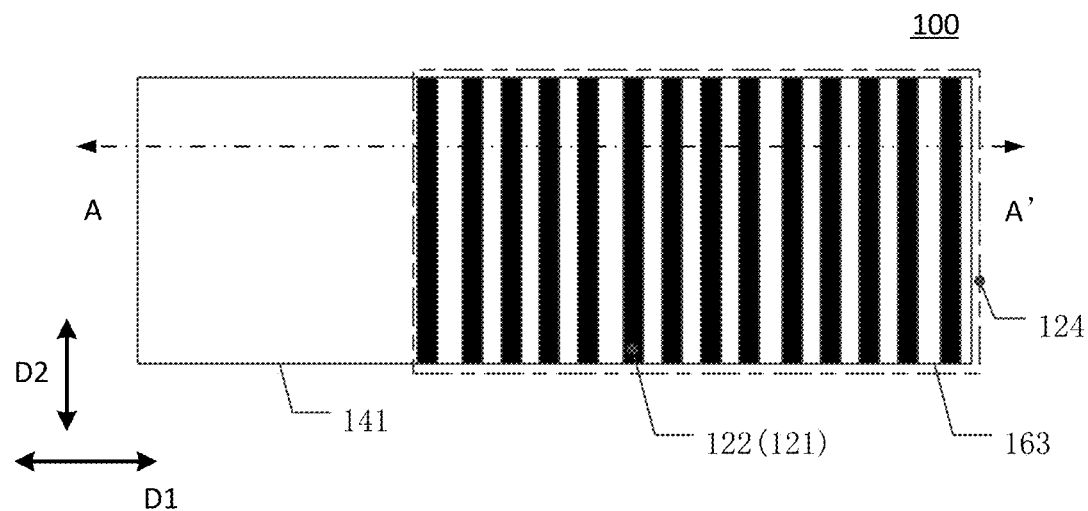
FIG. 1A is a schematic plan view of a light source module according to a first embodiment.
Figure 1B:
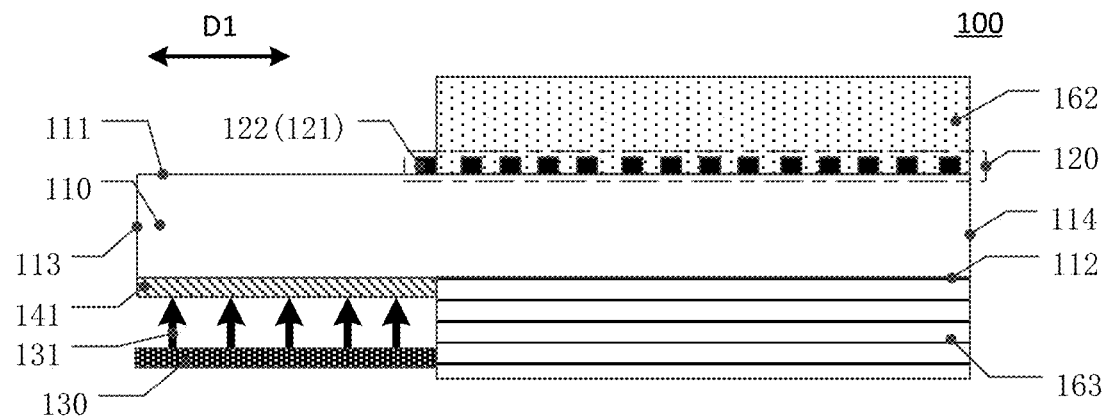
FIG. 1B is a schematic cross-sectional view of the light source module illustrated in FIG. 1A taken along the line A-A'.

For example, as illustrated in FIG. 1A and FIG. 1B, the light source module 100 comprises a light guide member 110, a light exiting member 120, a first collimating light source 130, and a first light modulating member 141. For example, as illustrated in FIG. 1A and FIG. 1B, the light source module 100 can further comprise a first substrate 162 and a second substrate 163 depending on actual requirements.

For example, the light guide member 110 will be described below with reference to FIGS. 1A, 1B, 2B, and 8B.

For example, as illustrated in FIGS. 1A and 1B, the light guide member 110 comprises a first surface 111 and a second surface 112 disposed opposite to the first surface 111. For example, as illustrated in FIG. 1A and FIG. 1B, the light guide member 110 further comprises a first side surface 113 and a second side surface 114. The first side surface 113 and the second side surface 114 are disposed opposite to each other in the first direction D1. For example, the first side surface 113 and the second side surface 114 can be perpendicular to the first surface 111.

For example, as illustrated in FIGS. 1A and 1B, the first surface 111 can be configured as a light exiting surface (that is, light transmitted in the light guide member 110 exits the light guide member 110 via the first surface 111) and can comprise a light exiting region 124. For example, a width of the light exiting region 124 in the second direction D2 (for example, the second direction D2 is perpendicular to the first direction D1) can be equal to or slightly smaller than a width of the light guide member 110 in the second direction D2.

For example, a thickness of the light guide member 110 (that is, the thickness of the light guide member 110 in a direction perpendicular to the first surface 111) can be set according to requirements of actual application, which is not limited in the embodiments of the present disclosure. For example, the light guide member 110 can have a thickness of 1 μm to 90 μm. For example, the light guide member 110 can be filled with more light when the light guide member 110 has a larger thickness (for example, 40 μm), thereby increasing intensity of the light emitted by the light source module 100. For another example, when the light guide member 110 has a small thickness (such as 2 μm), not only a thickness of the light source module 100 can be reduced (i.e., the thickness of the light source module 100 in a direction perpendicular to the first surface 111, for example, the thickness of the light source module 100 can be 0.5 mm), but also the width of the first light modulating member 141 in the first direction can be reduced. For the sake of clarity, a principle that the width of the first light modulating member 141 in the first direction will be lowered by reducing the thickness of the light guide member 110 will be described in a portion in which the first light modulating member 141 is depicted.

Figure 6A:
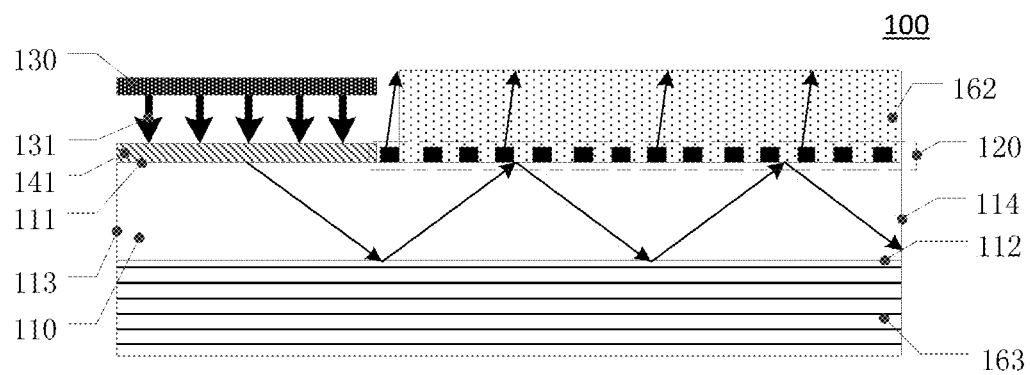
FIG. 6A is a schematic cross-sectional view of a light source module according to a fourth embodiment.

For example, as illustrated in FIG. 1B, light emitted by the first collimating light source 130 (i.e., the first collimated light 131) can be incident into the light guide member 110 via the second surface 112. However, the embodiments of the present disclosure are not limited thereto. For example, as illustrated in FIG. 6A, light emitted by the first collimating light source 130 can also be incident into the light guide member 110 via the first surface 111. For example, when intensity of the first collimated light 131 emitted by the first collimating light source 130 is constant, compared with a configuration that the first collimated light 131 is incident into the light guide member 110 via the first side surface 113 or the second side surface 114, a configuration that the first collimated light 131 is incident into the light guide member 110 via a surface (for example, the first surface 111) has an advantage that intensity of light incident into the light guide member 110 can be adjusted by adjusting the width of the first light modulating member 131 in the first direction, especially in a case that the light guide member 110 has a small thickness (for example, in a range of 2 to 5 micrometers).

Figure 8A:
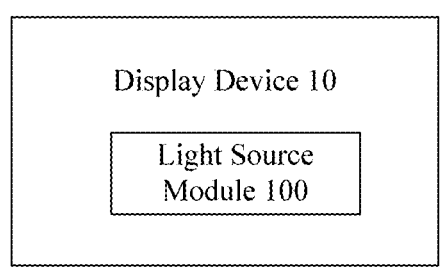
FIG. 8A is an exemplary block diagram of a display device according to the sixth embodiment.
Figure 8B:
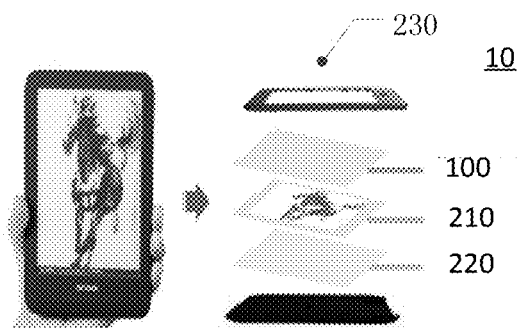
FIG. 8B is an exemplary structural diagram of the display device illustrated in FIG. 8A.

For example, the light guide member 110 can be made of a material that has high transmittance to visible light (that is, the absorption coefficient of visible light is small). And then, the light source module 100 can not only serve as a backlight source (that is, the light source module 100 is disposed further away from the user side with respect to display pixels of the display device). As illustrated in FIG. 8B, the light source module 100 can also be configured as a front light source of the display device 10 (that is, the light source module 100 is disposed closer to the user side 230 with respect to the display pixels 210 of the display device 10).

For example, refractive index of the material for the light guide member (i.e., the refractive index of the light guide member 110) is required to be greater than refractive indices of other layers with which it is in contact such that at least a portion of the light (for example, all light) incident into the light guide member 110) can meet the total reflection condition of the light guide member 110. For example, for the light source module 100 illustrated in FIG. 1B, the refractive index of the light guide member 110 is greater than the refractive indices of the first substrate 162 and the second substrate 163

Figure 2A:
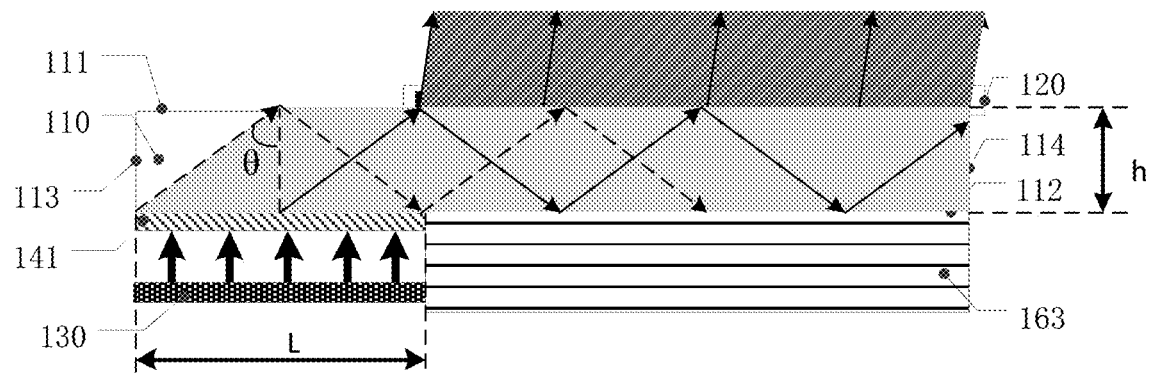
FIG. 2A is a schematic diagram of light transmission in a light guide member of the light source module illustrated in FIG. 1B.
Figure 2B:
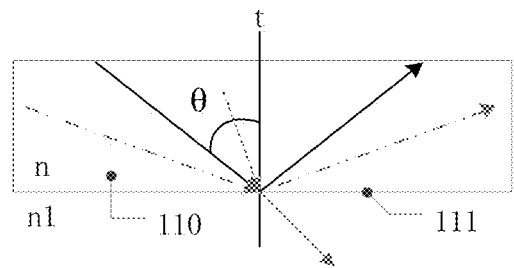
FIG. 2B is a schematic diagram of a total reflection condition of the light guide member of the light source module illustrated in FIG. 1B.

For example, FIG. 2B illustrates a schematic view of the total reflection condition of the light guide member 110. For example, when the refractive index of the material of the light guide member 110 is n and the refractive index of medium outside the light guide member 110 is n1 (for example, the refractive index of the first substrate 162 is n1), if transmission angle of light in the light guide member 110 (i.e., the angle θ between the transmission direction of light and the normal direction t of the first surface 111) is greater than arcsin (n1/n) (i.e., the total reflection critical angle of the light guide member 110), the light in the light guide member 110 satisfies the total reflection condition of the light guide member 110. For example, in the case where the refractive index n of the light guide member 110 is 1.8 and the refractive index n1 of the first substrate 162 is 1.5, the total reflection critical angle of the light guide member 110 is 56°. For example, the total reflection critical angle of the light guide member 110 decreases with an increase in the refractive index n of the light guide member 110 in a case where the refractive index n1 of the medium outside the light guide member 110 is constant, that is, the larger the refractive index n of the light guide member 110, the easier it is for light to meet the total reflection condition of the light guide member 110.

For example, material for the light guide member 110 can be set according to requirements of actual application, which is not limited by the embodiments of the present disclosure. For example, the light guide member 110 can be made of silicon nitride (Si3N4), with a refractive index of about 1.6-2.0. For another example, the light guide member 110 can also be made of indium tin oxide (ITO) with a refractive index of about 1.7. For still another example, the light guide member 110 can also be made of quartz glass (SiO2) with a refractive index of about 1.45-1.6. In this case, if the light source module 100 further comprises a first substrate 162 and a second substrate 163, the refractive indexes of the first substrate 162 and the second substrate 163 are required to be less than the refractive index of quartz glass.

For example, the first collimating light source 130 will be described below with reference to FIGS. 1A-1B and FIGS. 2C-2D.

For example, as illustrated in FIGS. 1A and 1B, the first collimating light source 130 is configured to provide a first collimated light 131. For example, the first collimating light source 130 can be disposed on a side of the first light modulating member 141 away from the light guide member 110, but the embodiments of the present disclosure are not limited thereto.

Figure 2C:
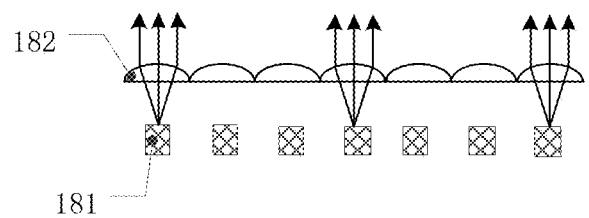
FIG. 2C is a schematic structural view of a first collimating light source of the light source module illustrated in FIG. 1B.
Figure 2D:
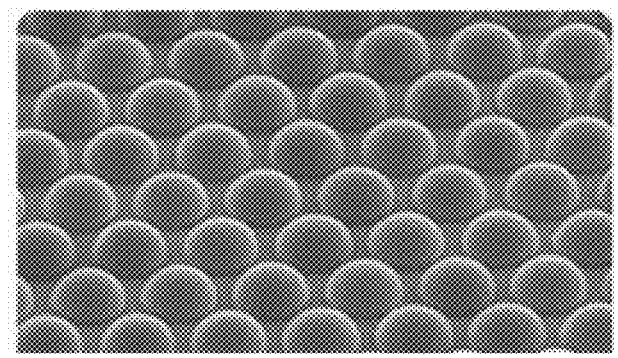
FIG. 2D is a schematic structural view of a collimating lens array of the first collimating light source illustrated in FIG. 1B.

For example, a structure and a type of the first collimating light source 130 can be set according to requirements of actual application, which is not limited in the embodiment of the present disclosure. For example, as illustrated in FIG. 2C, the first collimating light source 130 can comprise light emitting diodes 181 arranged in an array and collimating lenses 182 arranged in an array (i.e., a collimating lenses array). Divergent light emitted by the light emitting diode 181 can be collimated a corresponding collimating lens 182 and converted to collimated light. For example, the collimating lenses 182 can be convexo-plane spherical lenses as illustrated in FIG. 2D, but the embodiments of the present disclosure are not limited thereto. For example, the collimating lenses 182 can also be aspherical lenses.

For example, as illustrated in FIG. 1A, the first collimated light 131 emitted by the first collimating light source 130 is a strip light source. For example, a size of the first collimated light 131 (i.e., the strip light source) in the second direction D2 can be equal to or slightly greater than a width of the light exiting region 124 of the first surface 111 in the second direction D2, so that light exits the light exiting region 124 at every place in the second direction D2.

For example, a size of the first collimating light source 130 in the second direction D2 may be equal to a size of the first collimated light 131 in the second direction D2. For another example, the size of the first collimating light source 130 in the second direction D2 can be less than the size of the first collimated light 131 in the second direction D2. In this case, in an example, the first collimating light source 130 can further comprise a beam expander, so that a weight and a size of the light source module 100 can be reduced.

For example, the first collimating light source 130 can emit monochromatic light. For another example, the first collimating light source 130 can also emit chromatic lights obtained by mixing monochromatic lights. For another example, the first collimating light source 130 can also emit chromatic light with a broadband (i.e., the emitted chromatic light has a wide spectrum such as greater than 200 nanometers).

For example, the light exiting member 120 will be described below with reference to FIGS. 1A-1B, 2E, and 4A.

For example, as illustrated in FIG. 1A and FIG. 1B, the light exiting member 120 is disposed on the first surface 111 in the light exiting region 124. For example, as illustrated in FIG. 1A and FIG. 1B, the light exiting member 120 can be a light exiting grating, and the light exiting grating can comprise a plurality of grating sub-structures 121 disposed at intervals in the first direction D1. For example, each of the grating sub-structures 121 comprises a first grating bar 122 extending in the second direction D2. For example, when the light in the light guide member 110 is transmitted to the light exiting region 124, a part of the light incident on the light exiting region 124 will be diffracted due to the light exiting grating and be emitting from the first surface 111 and leave the light guide member 110 and the light source module 100.

Figure 2E:
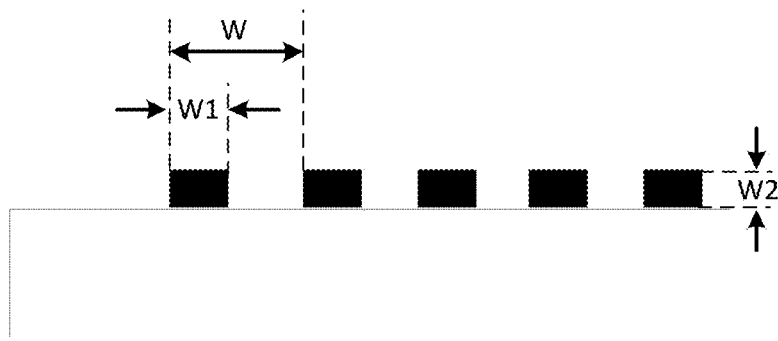
FIG. 2E is a partial enlarged view of a light exiting member of the light source module illustrated in FIG. 1B.

For example, the light exiting region 124 can be divided into a plurality of subareas. For any subarea, a ratio of intensity of the diffracted light to intensity of the light incident on the subarea is referred to as a light exiting efficiency of the subarea. For example, the light emitting efficiency of the subarea can be adjusted by adjusting the period, the height and the duty cycle of the light exiting grating. For example, FIG. 2E illustrates a schematic cross-sectional view of the light exiting grating (i.e., the light exiting member 120), where w is the period of the light exit grating, w1 is a width of the first grating bar 122 in the first direction D1, w2 is the height of the light exiting grating (i.e., the height of the light exiting grating in a direction perpendicular to the first surface 111). For example, the duty cycle of the light exiting grating is equal to w1/w.

For example, in each subarea of the light exiting region 124, the first grating bars 122 included in each subarea can be uniformly arranged. For example, distances between adjacent first grating bars 122 in the first direction D1 are equal each other.

For example, in order to improve the light exiting uniformity of the light exiting region 124 and the light source module 100, the light exiting efficiency of the light exiting member 120 can be designed to gradually change in the first direction D1. For example, in the case that the collimated light is incident on the left side of the light guide member 110, the light exiting efficiency of the light exiting member 120 can be designed to gradually increase from left to right. In this case, the light exiting member 120 can be divided into a plurality of regions in the first direction D1, and the light exiting efficiency of the light exiting grating disposed in the left regions are smaller than the light exiting efficiency of the light exiting grating disposed in the right regions. For example, configuration of the light exiting member 120 (for example, the period, the height and the duty cycle of the light exiting grating in any sub-region) can be determined based on actual requirements on the light exiting efficiency and the uniformity of the light by the light source module 100 according to the principle of the grating design, and will not be elaborated herein.

For example, material and refractive index of the light exiting member 120 (i.e., the refractive index of the material for the light exiting member 120, for example, the refractive index of the first grating bar 122) can be determined according to actual requirements, and will not be limited in the embodiments of the present disclosure. For example, the refractive index of the light exiting member 120 can be the same as the refractive index of the light guide member 110. That is, the light exiting member 120 and the light guide member 110 are made of the same material, but the embodiment of the present disclosure is not limited thereto. For example, the light exiting member 120 can also be made of resin.

Figure 4A:
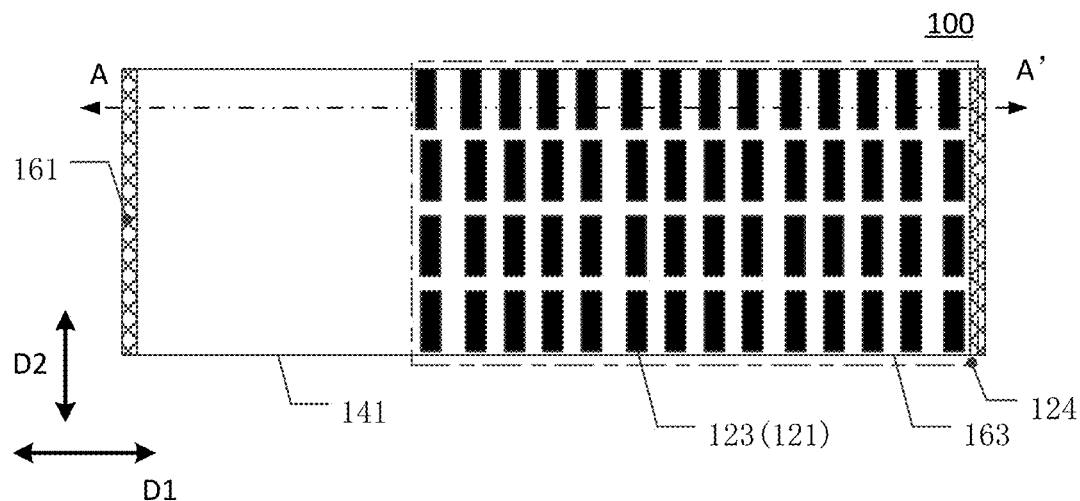
FIG. 4A is a schematic plan view of a light source module according to a second embodiment.

For example, the light exiting member 120 is not limited to the configuration as illustrated in FIG. 1A. For example, according to actual requirements, the light exiting member 120 can also be configured as illustrated in FIG. 4A. That is, the light exiting member 120 can comprise a plurality of grating sub-structures 121 spaced apart in the first direction D1, and each grating sub-structure 121 comprises a plurality of second grating bars 123 spaced apart in the second direction D2. For example, the light exiting member 120 illustrated in FIG. 4A can be designed by referring to the light exiting member 120 as illustrated in FIG. 1A, and details will not be elaborated here.

For example, the first light modulating member 141 as illustrated in FIG. 1B will be described below with reference to FIGS. 1A-1C and 3A-3C.

For example, the first light modulating member 141 is disposed on the second surface 112, and is configured to change the transmission direction of the first collimated light 131 so as to make it incident into the light guide member 110 and make at least part of the first collimated light 131 (for example, all) satisfy the total reflection condition of the light guide member 110; therefore, the first collimated light 131 can be incident into the light guide member 110 via the second surface 112.

For example, as illustrated in FIG. 1B, the first collimated light 131 can be perpendicularly incident on the first light modulating member 141, that is, the first collimated light 131 is parallel to the normal direction t of the first surface 111. For example, in the case where the first light modulating member 141 is disposed on a side of the first surface 111 corresponding to the first side 113, the first collimated light 131 emitted from the first collimating light source 130 is transmitted in the first direction in the light guide member 110 (for example, from left to right).

For example, as illustrated in FIG. 2A, in a case where the width L of the first light modulating member 141 in the first direction D1 is greater than or equal to $2h \times \tan \theta$, there will be light incident on any position of the light exiting region 124 of the light guide member 110. Therefore, there is no dark area in the light exiting region 124 of the light source module 100 according to the embodiment of the present disclosure, and thus the display effect of a display device comprising the light source module 100 can be improved; wherein, $\theta$ is the angle between the transmission direction of the light in the light guide member 110 and the normal direction t of the first surface 111, and h is the thickness of the light guide member 110 in a direction perpendicular to the first surface 111.

For example, in a case where the angle $\theta$ between the transmission direction of the light in the light guide member 110 and the normal direction t of the first surface 111 is constant, the less the thickness h of the light guide member 110 in the direction perpendicular to the first surface 111, the less the minimum value (i.e., $2h \times \tan \theta$) of the width L of the first light modulating member 141 in the first direction D1 is. Therefore, the width of the first light modulating member 141 in the first direction D1 can be decreased by reducing the thickness h of the light guide member 110 so as to increase the ratio of the area of the light exiting region 124 to the area of the first surface 111 and further to make a frame of a display device comprising the light source module 100 narrower, thereby facilitating to obtain a narrow frame display device.

For example, an orthographic projection of the light exiting member 120 on the first surface 111 partially overlaps with an orthographic projection of the first light modulating member 141 on the first surface 111 (for example, a size of the overlapping area in the first direction D1 is about 100 μm to 1 mm), thereby making the size of the light exiting region 124 in the first direction D1 equal to the size of the light exiting member 120 in the first direction.

For example, the type of the first light modulating member 141 can be selected based on actual requirements, which is not limited in the embodiments of the present disclosure.

For example, the first light modulating member 141 can be a volume grating (for example, the volume grating illustrated in FIG. 3A), and the light source module 100 in which a volume grating serves as the first light modulating member 141 will be described below in conjunction with FIGS. 3A and 3B. It should be noted that, for the sake of clarity, FIGS. 3A and 3B just illustrate the first light modulating member 141 and the light guide member 100 comprised in the light source module 100.

Figure 3A:
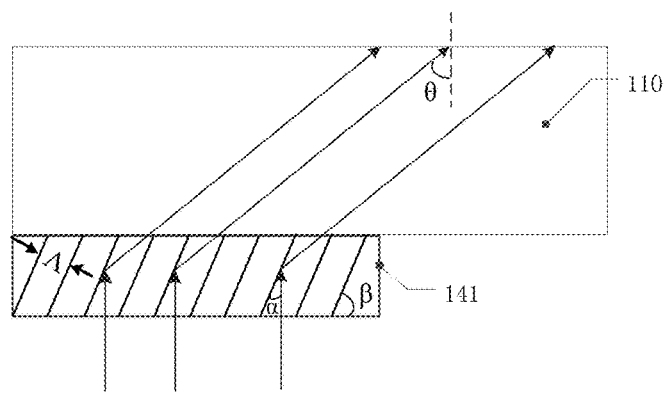
FIG. 3A is an exemplary structural diagram of a first light modulating member of the light source module illustrated in FIG. 1B.
Figure 3B:
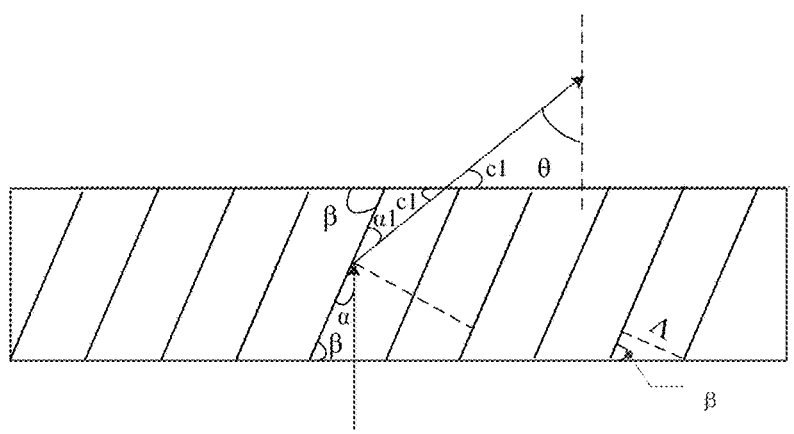
FIG. 3B is a partial enlarged view of the first light modulating member illustrated in FIG. 3A.

For example, the refractive index in the volume grating changes periodically, and inclined lines illustrated in FIGS. 3A and 3B are intended to indicate the periodic structure of the volume grating. For example, as illustrated in FIG. 3A, $\Lambda$ is the period of the volume grating, $\alpha$ is the Bragg angle of the volume grating, $\beta$ is the inclined angle of the volume grating, and $\alpha 1$ is the exiting angle of the light diffracted by the volume grating.

For example, in a case that the period $\Lambda$ of the volume grating, the Bragg angle $\alpha$ of the volume grating and the inclined angle $\beta$ of the volume grating satisfy the following condition, that is, $a=\theta/2$; $\beta=\pi/2-\theta/2$; $\Lambda=\lambda/(2\sin(\theta/2))$, the volume grating allows the transmission angle of at least part of the light perpendicularly incident thereon in the optical waveguide member 110 (the angle between the transmission direction of the light in the light guide member 110 and the normal direction of the first surface 111) to be $\theta$; and at this time, in a case that $\theta$ is greater than $\arcsin(n1/n)$, the volume grating can make at least a portion (for example, greater than 95%) of the light perpendicularly incident thereon satisfy the total reflection condition of the light guide member 110.

For example, the principle of the volume grating changing the angle of light will be described below in connection with FIG. 3B. For example, in a case where the first collimated light 131 is perpendicularly incident on the first light modulating member 141, the volume grating has a Bragg angle of $\alpha=\pi/2-\beta$. For example, as can be seen from FIG. 3B, $\beta=\alpha 1+c 1=\alpha 1+\pi/2-\theta=\lambda 2-\alpha$. Therefore, $\alpha 1+\alpha=\theta$. For example, in the case of $\alpha 1=\alpha$, the intensity of the diffracted light of the volume grating is the largest (for example, the intensity of the diffracted light can be more than 95% of the intensity of light incident on the volume grating, that is, the diffraction efficiency of the volume grating can be greater than 95%), and $\alpha 1$ and $\alpha$ satisfy the grating equation $\Lambda(\sin\alpha+\sin\alpha 1)=\lambda$, that is, $\Lambda=\lambda/(2\sin\alpha)$. Therefore, $\alpha=\theta/2$; $\beta=\pi/2-\theta/2$; $\Lambda=\lambda/(2\sin(\theta/2))$, where $\lambda$ is the wavelength of the light incident on the first light modulating member 141.

For example, in a case where the first light modulating member 141 of the light source module 100 illustrated in FIG. 1B is a volume grating, material for the volume grating can be selected according to actual requirements, which is not limited in the embodiment of the present disclosure. For example, the volume grating can be made of silver halide, dichromated gelatin, photopolymers, photoresists, photoconductive thermoplastics, photorefractive crystals, or other suitable materials. For example, according to actual requirements, the volume grating illustrated in FIG. 5F can also be made of one of the above materials. The volume grating can be formed through a suitable preparing method, such as photolithography, imprinting, and the like.

Figure 3C:
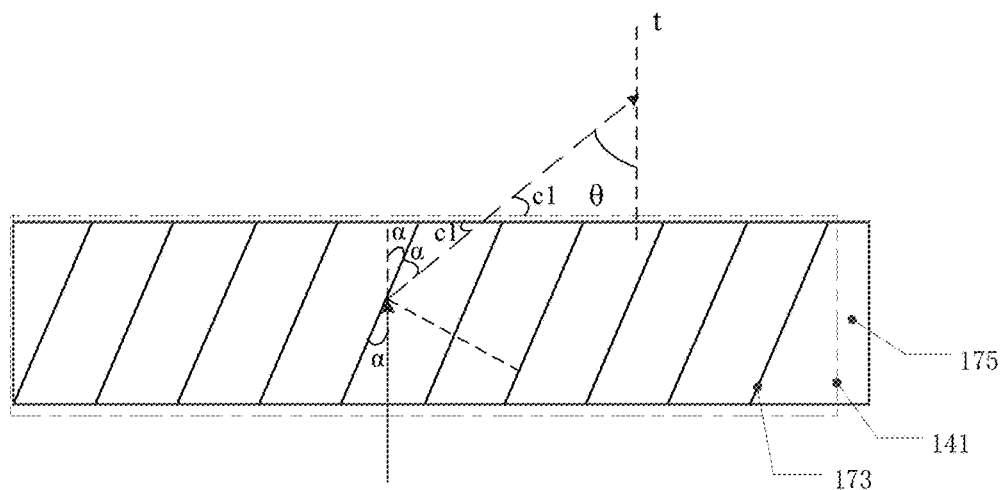
FIG. 3C is another exemplary structural diagram of the first light modulating member of the light source module illustrated in FIG. 1B.

For example, the first light modulating member 141 can also be an array of reflective modulating members (for example, the array of reflective modulating member illustrate in FIG. 3C). The light source module 100 in which an array of reflective modulating members serves as the first light modulating member 141 will be described below in connection with FIG. 3C.

For example, as illustrated in FIG. 3C, the array of reflective modulating members comprises a plurality of reflective modulating substructures 173 arranged in parallel in the first direction D1. For example, a size of each reflection modulating substructures 173 in the second direction D2 can be equal to the size of the first light modulating member 141 in the second direction D2.

For example, the reflective modulating substructure 173 can have high reflectance for visible light (for example, the reflectance of the reflective modulating substructure 173 can be greater than 99.5% for visible light), whereby the reflective modulating substructure 173 can change the transmission direction of light incident thereon, and thus the light incident thereon can be incident into the light guide member 110.

For example, the reflective modulating substructure 173 can be a multilayer dielectric film, which can be disposed, for example, in a transparent substrate 175 (for example, a glass substrate). For another example, the reflection modulating substructure 173 can also be implemented as a reflective mirror, which is not limited in the embodiments of the present disclosure.

For example, an angle between the reflective modulating substructure 173 and the normal direction of the first surface 111 can be a; therefore, in the case where the first collimated light 131 is perpendicularly incident on the first light modulating member 141 (for example, the first collimated light 131 is perpendicular to a surface of the transparent substrate 175 parallel to the first surface 111, that is, the first collimated light 131 is parallel to the normal direction t of the first surface 111), and an angle between the first collimated light 131 and a surface of the reflective modulating substructure 173 is a, and an angle between the first collimated light 131 reflected by the reflective modulating substructure 173 and the surface of the reflective modulating substructure 173 is also a; as illustrate in FIG. 3C, $\alpha+\alpha=\pi/2-c1=\theta$, that is, in the case of an angle between the reflective modulating substructure 173 and the normal direction of the first surface 111 is $\alpha=\theta/2$, the array of reflective modulating structures makes the transmission angle of the first collimated light 131 in the light guide member 110 (that is, the angle between the transmission direction of the light in the light guide member 110 and the normal direction t of the first surface 111) is $\theta$; and at this time, if $\theta$ is greater than $\arcsin(n1/n)$, the array of reflective modulating structures can make the first collimated light 131 satisfy the total reflection condition of the light guide member 110.

For example, according to actual requirements, the first light modulating member 141 can also be a step grating or other suitable light modulating member capable of changing direction of the incident light, which is not limited in the embodiments of the present disclosure. For example, a structure of an exemplary step grating can be designed with reference to the embodiments illustrated in FIGS. 5D and 5E, and will not be elaborated herein.

It should be noted that, the light source module is described in the present disclosure by taking the first collimated light 131 perpendicularly incident on the first light modulating member 141 as an example, and the embodiments of the present disclosure is not limited thereto. For example, the first collimated light 131 can also be incident on the first light modulating member 141 at other angles, and relevant parameters of the first light modulating member 141 (for example, the inclined angle and the period of the volume grating, or the angle between the reflective modulating substructure 173 and the normal direction of the first surface 111) are required to be changed accordingly. For example, in the case where the first collimated light 131 is incident on the first light modulating member 141 at other angles, a method for designing relevant parameters of the first light modulating member 141 can be referred to the embodiments of FIGS. 3A-3C, and it will not be elaborated herein.

For example, the first substrate 162 and the second substrate 163 can be glass substrates, quartz substrates, plastic substrates (such as a polyethylene terephthalate (PET) substrate), or substrates made of resin or other suitable materials. For example, the refractive indices of the first substrate 162 and the second substrate 163 are required to be less than the refractive index of the light guide member 110. For example, the thicknesses of the first substrate 162 and the second substrate 163 (that is, the thickness in the direction perpendicular to the first surface 111) can be about 0.1-2 mm; for example, the thicknesses of the first substrate 162 and the second substrate 163 can be 1 mm, but embodiments of the present disclosure are not limited thereto. For example, the first substrate 162 and the second substrate 163 can have good flatness and parallelism, so that the deterioration in the light exiting uniformity and the light exiting efficiency of the light source module 100 at poor flatness and parallelism can be avoided.

For example, in the embodiment, by arranging the first light modulating member 141, the light emitted from the collimating light source can be incident on the light guide member 110 through the second surface 112 and at least part of the light incident thereon can be enabled (for example, more than 95%) to satisfy the total reflection condition of the light guide member 110, so that the light incident on the light guide member 110 can be transmitted to the light exiting region 124 of the light source module 100 and exits at the light exiting region 124. For example, by setting the width L of the first light modulating member 141 in the first direction D1 greater than or equal to 2h×tan θ, there is no dark area in the light exiting region 124 of the light source module 100, and thus display effect of a display device comprising the light source module 100 can be improved.

Second Embodiment

The embodiment provides a light source module 100. The light source module 100 can be configured as a light source for a display device. For example, FIGS. 4A and 4B respectively illustrate a schematic plan view and a cross-sectional schematic view of the light source module 100 according to the second embodiment, and FIG. 4B illustrates a schematic cross-sectional view taken along line A-A' illustrated in FIG. 4A.

For example, the light source module 100 according to the second embodiment is similar to the first embodiment. Therefore, only the difference between the present embodiment and the first embodiment will be described, and the common will not be elaborated. For example, as illustrated in FIGS. 4A and 4B, similar to the light source module 100 according to the first embodiment, the light source module 100 according to the second embodiment can also comprise the light guide member 110, the light exiting member 120, the first collimating light source 130, and the first light modulating member 141.

Figure 4B:
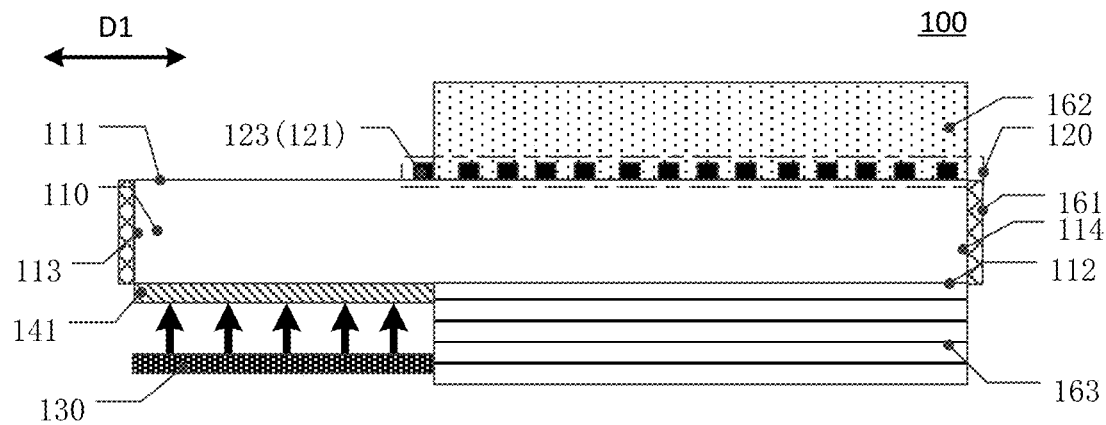
FIG. 4B is a cross-sectional view of the light source module illustrated in FIG. 4A taken along line A-A'.

For example, as illustrated in FIGS. 4A and 4B, according to actual requirements, the light source module 100 can further comprise a reflective member 161. For example, the reflective member 161 can be disposed on at least one of the first side 113 and the second side 114. For example, as illustrated in FIGS. 4A and 4B, the reflective members 161 can be simultaneously disposed on both the first side 113 and the second side 114.

For example, the reflective member 161 can have a reflectance of greater than 99.5% for visible light. Therefore, the reflective member 161 can reflect light incident thereon (ie, the light in the light guide member) back into the light guide member 110; and at least part of light reflected back to the light guide member 110 can be emitted from the light exiting region 124 and exit the light guide member 110. Thus, the efficiency of the light source module 100 according to this embodiment is improved. For example, according to actual requirements, the light source module 100 according to other embodiments of the present disclosure (for example, the first embodiment, the third embodiment, the fourth embodiment, and the fifth embodiment) can also be provided with a reflective member 161 so as to improve the efficiency of the light source module 100.

For example, as illustrated in FIGS. 4A and 4B, the light exiting member 120 according to the second embodiment comprises a plurality of grating sub-structures 121 spaced apart in the first direction D1, and each of the grating sub-structures 121 comprises a plurality of second grating bars 123 spaced apart in the second direction D2. As a result, not only light transmitted in the first direction D1 can be emitted through the light exiting member 120 and exits the light guide member 110 but also light transmitted in the second direction D2 can be emitted through the light exiting member 120 and exits the light guide member 110. For example, according to actual requirements, the light exiting member 120 of the light source module 100 according to other embodiments of the present disclosure (for example, the first embodiment, the third embodiment, and the fourth embodiment) can also be configured as illustrated in FIG. 4A.

For example, in the present embodiment, the reflective member 161 is provided, and as a result, light incident on the reflective member 161 can be reflected back to the light guide member 110, thereby improving the efficiency of the light source module 100. For example, in this embodiment, each grating sub-structure 121 comprises a plurality of second grating bars 123 spaced apart in the second direction D2, and light transmitted in the second direction D2 can also be emitted from the light exiting member 120 and exits the light guide member 110.

Third Embodiment

Figure 5A:
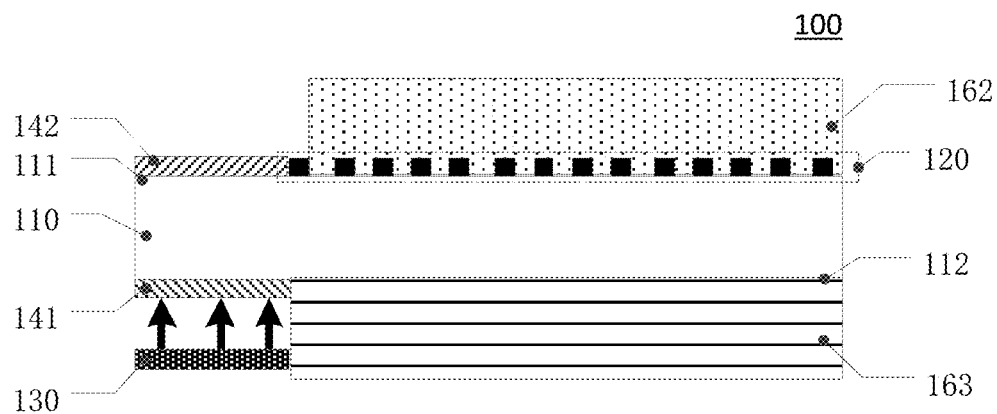
FIG. 5A is a schematic cross-sectional view of a light source module according to a third embodiment.

The present embodiment provides a light source module 100 which can be configured as a light source for a display device. For example, FIG. 5A illustrates a schematic cross sectional view of the light source module 100 according to the third embodiment. For example, the light source module 100 according to the third embodiment is similar to that of the first embodiment, and only the difference therebetween will be described and the common will not be elaborated herein.

Figure 5B:
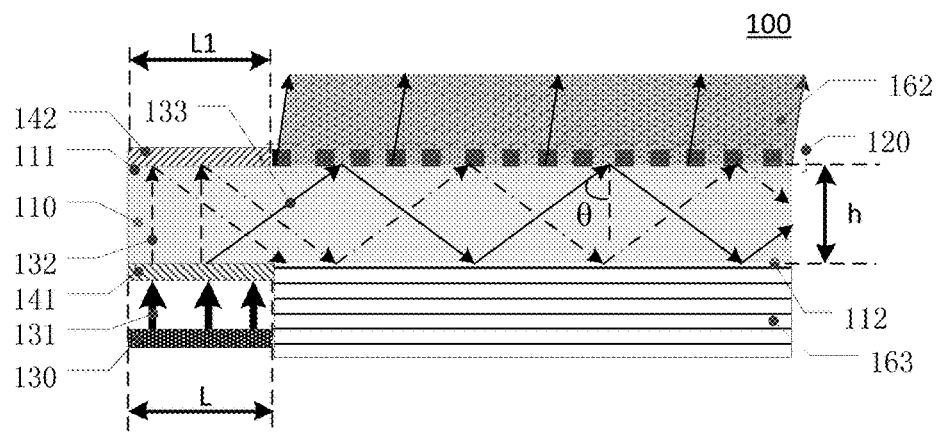
FIG. 5B is a schematic diagram of light transmission in the light guide member of the light source module illustrated in FIG. 5A.

For example, the light source module 100 can comprise a light guide member 110, a light exiting member 120, a first collimating light source 130, a first light modulating member 141, and a second light modulating member 142. For example, as illustrated in FIGS. 5A and 5B, the first light modulating member 141 is disposed on the second surface 112, and the second light modulating member 142 is disposed on the first surface 111 and opposite to the first light modulating member 141.

Figure 5C:
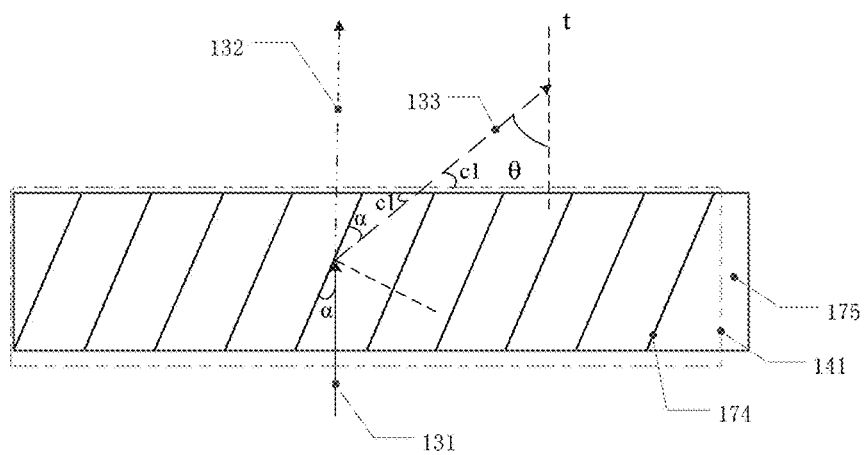
FIG. 5C is an exemplary structural diagram of the first light modulating member of the light source module illustrated in FIG. 5A.
Figure 5D:
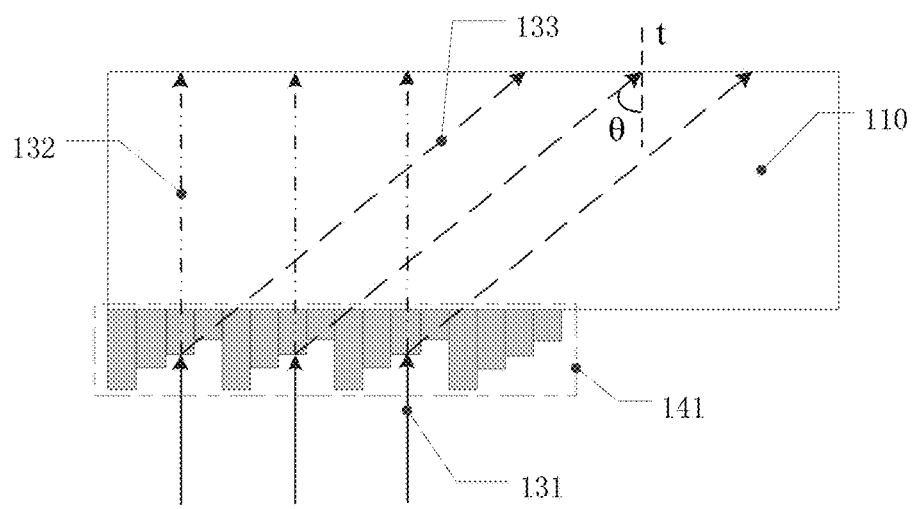
FIG. 5D is another exemplary structural diagram of the first light modulating member of the light source module illustrated own in FIG. 5A.

For example, as illustrated in FIGS. 5C and 5D, the first light modulating member 141 can be configured such that the first collimated light 131 incident thereon is divided into a first modulated light 132 with unchanged transmission direction and a second modulated light 133 with changed transmission direction. For example, the first light modulating member 141 can make the second modulated light 133 satisfy the total reflection condition of the light guide member 110. For example, the first modulated light 132 is perpendicularly incident on the second light modulating member 142. For example, the second light modulating member 142 can make the first modulated light 132 incident thereon satisfy the total reflection condition of the light guide member 110.

For example, the intensities of the first modulated light 132 and the second modulated light 133 can be equal to each other so as to improve the light uniformity of the light source module 100, but the embodiment of the present disclosure is not limited thereto. For example, in a case where the efficiency (for example, diffraction efficiency) of the second light modulating member 142 is less than 90%, it is also possible to make the intensity of the first modulated light 132 greater than the intensity of the second modulated light 133 so that the intensity of a part of the first modulated light 132 satisfying the total reflection condition of the light guide member 110 is equal to the intensity of the second modulated light 133 after subject to the effect of second light modulating member 142 (for example, diffraction or reflection).

For example, in a case where the width L of the first light modulating member 141 in the first direction D1 is greater than or equal to h×tan θ, and the width L1 of the second light modulating member 142 in the first direction D1 is greater than or equal to h×tan θ, there is light (i.e., light transmitted in the light guide member 110) at any position of the light exiting region 124 of the light guide member 110; therefore, there is no dark region in the light exiting region of the light source module 100 according to the embodiment of the present disclosure, and display effect of a display device comprising the light source module according to the present embodiment can be improved. Here, θ is the angle between the transmission direction of the light in the light guide member 110 and the normal direction of the first surface 111, and h is the thickness of the light guide member 110 in the direction perpendicular to the first surface 111. For example, by providing the first light modulating member 141 on the second surface 112 and the second light modulating member 142 on the first surface 111, the width of the first modulating member 141 in the first direction D1 can be decreased while ensuring that there is no dark region in the light exit region 124, thereby increasing a ratio of the area of the light exiting region 124 to the area of the first surface 111, so that the frame size of a display device comprising the light source module 100 can be made narrower, and thus facilitating to obtain a display device with narrow frame.

For example, the type and structural parameters of the first light modulating member 141 comprised in the light source module 100 illustrated in FIG. 5A can be set according to actual requirements, which is not limited in the embodiment of the present disclosure. For example, the first light modulating member 141 as illustrated in FIGS. 5A and 5B will be described exemplarily with reference to FIG. 5C to FIG. 5E.

For example, the first light modulating member 141 can be an array of reflective modulating structures (for example, an array of reflective modulating structures illustrated in FIG. 5C). A light source module 100 in which an array of reflective modulating structures serves as the first light modulating member 141 will be described below in connection with FIG. 5C. For example, FIG. 5C exemplarily illustrates an array of reflective modulating structures. For example, the array of reflective modulating structures illustrated in FIG. 5C is similar to the array of reflective modulating structures illustrated in FIG. 3C, except that the array of reflective modulating structures illustrated in FIG. 5C comprises a plurality of transflective modulating substructure 174 arranged in parallel in the first direction D1.

For example, the transflective modulating substructure 174 can transmit half of the light incident thereon (i.e., the first modulated light 132) and can reflect half of light incident thereon (i.e., the second modulated light 133).

For example, the transmission direction of the half portion of light transmitted through the transflective modulating substructure 174 (i.e., the first modulated light 132) will not be changed, and thus the first modulated light 132 can be perpendicularly incident on the second light modulating member 142 (that is, the first modulated light 132 can be parallel to the normal direction of the first surface 111).

For example, the transmission angle of the half portion of light reflected by the transflective modulating substructure 174 (i.e., the second modulated light 133) will be changed. For example, in a case of an angle α=θ/2 between the transflective modulating substructure 174 and the normal direction of the first surface 111, the array of reflective modulating structures can make the transmission angle of the second modulated light 133 in the light guide member 110 (the angle between the transmission direction of the light in the light guide member 110 and the normal direction of the first surface 111) be θ. At this time, if θ is greater than arcsin(n1/n), the array of reflective modulating structures can make at least portion of light incident thereon perpendicularly (that is, the second modulating light 133) satisfy the total reflection condition of the light guide member 110.

For example, the first light modulating member 141 can also be a step grating (for example, the step grating illustrated in FIG. 5D), and the light source module 100 adopting a step grating as the first light modulating member 141 will be described below in conjunction with FIGS. 5D and 5E. For example, FIG. 5D exemplarily illustrates a step grating. For example, as illustrated in FIG. 5D, the step grating can divide the first collimated light 131 incident thereon into a first modulated light 132 with a constant transmission direction and a second modulated light 133 with a changed transmission direction. For example, the first light modulating member 141 can make the first modulated light 132 perpendicularly incident on the second light modulating member 142 (that is, parallel to the normal direction of the first surface 111), and can make the transmission angle of the second modulated light 133 in the light guide member 110 be θ. In the case that θ is greater than arcsin(n1/n), the step grating can make the second modulated light 133 satisfy the total reflection condition of the light guide member 110.

For example, the step grating comprises a plurality of step grating sub-structures 121 that are periodically arranged. For example, Num step grating sub-structures 121 can be comprised in each period of the step grating. For example, the width of each step grating sub-structure 121 in the first direction D1 is b; the width of the step grating in each period in the first direction D1 is b1=Num×b; the height of the i-th step of the step grating in each period is hi. For example, in the case of Num=4, b=100 nm, b1=400 nm, h1=472 nm, h2=351 nm, h3=185 nm, h4=17 nm, a ration of the intensity of the first modulated light 132 (i.e., the 0-order diffracted light of the step grating) to the intensity of the first collimated light 131 is 49.4%, and a ratio of the intensity of the second modulated light 133 (that is, the −1-th order diffracted light of the step grating) of the intensity of the first collated light 131 is 49.3%, the transmission angle of the second modulated light 133 at the light guide member 110 is 62.457 degrees; at this time, the intensity of the first modulated light 132 is substantially equal to the intensity of the second modulated light 133. For example, in a case where the refractive index n of the light guide member 110 is 1.8 and the refractive index n1 of the first substrate 162 is 1.5, the total reflection critical angle of the light guide member 110 is 56 degrees, and the transmission angle θ of the second modulated light ray 133 in the light guide member 110 (62.457 degrees) satisfies the total reflection condition of the light guide member 110.

For example, in a case where the first light modulating member 141 of the light source module 100 as illustrated in FIG. 5A is a step grating, a material for the step grating can be selected according to actual requirements, which is not limited in the embodiment of the present disclosure. For example, the step grating can be made of a suitable dielectric material such as polycarbonate (PC), polymethyl methacrylate (PMMA), or the like. The step grating can be made through a suitable preparation method, which comprises photolithography, imprinting, and etc.

For example, according to actual requirements, the first light modulating member 141 as illustrated in FIG. 5A can also adopt other suitable light modulating structures (for example, volume gratings) capable of changing the direction of the incident light, which is not limited in the embodiments of the present disclosure.

For example, the type and the structure parameters of the second light modulating member 142 comprised in the light source module 100 as illustrated in FIG. 5A can be set according to actual requirements, which is not limited in the embodiment of the present disclosure. For example, the second light modulating member 142 as illustrated in FIGS. 5A and 5B will be described below with reference to FIG. 5F to FIG. 5H.

For example, the second light modulating member 142 can be a volume grating (for example, a volume grating illustrated in FIG. 5F), and the light source module 100 adopting the volume grating as the second light modulating member 142 will be described below with reference to FIG. 5F. For example, FIG. 5F exemplarily illustrates a volume grating. For example, as illustrated in FIG. 5F, Λ is the period of the volume grating, α is the Bragg angle of the volume grating, β is the inclined angle of the volume grating, and α1 is the emitting angle of the diffracted light of the volume grating. For example, in the period Λ of the volume grating, the Bragg angle α of the volume grating and the inclined angle β of the volume grating satisfy the following condition, that is, β=θ/2; α=π/2−θ/2; Λ=λ/(2 sin(π/2−θ/2)), the volume grating makes the transmission angle of at least part of the first modulated light 132 in the light guide member 110 (the angle between the transmission direction of the light in the light guide member 110 and the normal direction of the first surface 111) be θ; and at this time, if θ is greater than arcsin(n1/n), the volume grating can enable at least part of the first modulated light 132 (for example, more than 95%) satisfy the total reflection condition of the light guide member 110.

The principle of the volume grating changing the angle of light will be described below in connection with FIG. 5F. For example, in the case where the first modulated light 132 is perpendicularly incident on the second light modulating member 142 (that is, the first modulated light 132 is parallel to the normal direction t of the first surface 111), the Bragg angle α of the volume grating is π/2−β. For example, as is apparent from FIG. 3B, α=π/2−c1, that is, β=c1. For example, in the case of α1=α, the intensity of the diffracted light of the volume grating is the greatest (for example, the intensity of the diffracted light may be more than 95% of the intensity of light incident on the volume grating, that is, the diffraction efficiency of the volume grating can be greater than 95%), and α1 and α satisfy the grating equation Λ(sin α+sin α1)=λ, that is, Λ=λ/(2 sin α). Therefore, β3=c1=c2=θ/2; α=π/2−θ/2; Λ=λ/(2 sin(π/2−θ/2)), where λ is the wavelength of light incident on the volume grating.

Figure 5E:
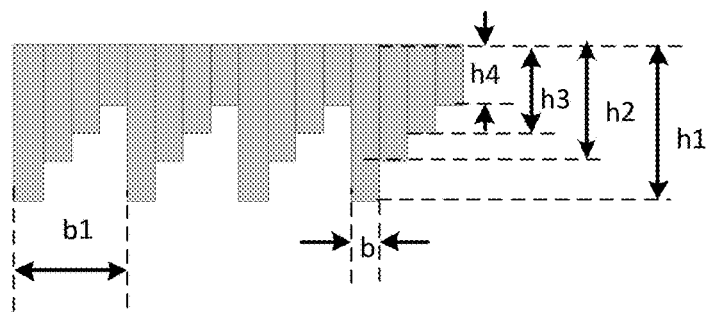
FIG. 5E is an enlarged view of a step grating comprised in the light source module illustrated in FIG. 5D.
Figure 5F:
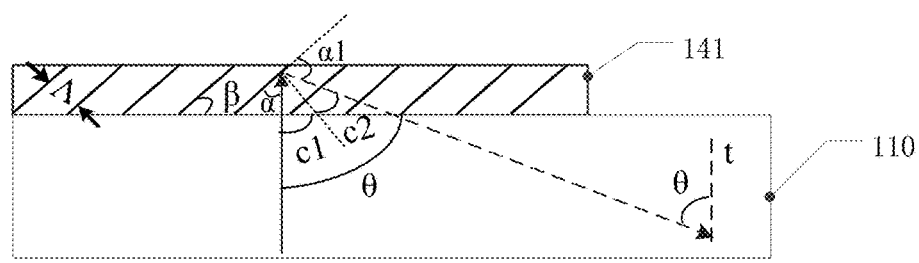
FIG. 5F is an exemplary structural diagram of the second light modulating member of the light source module illustrated in FIG. 5A.
Figure 5G:
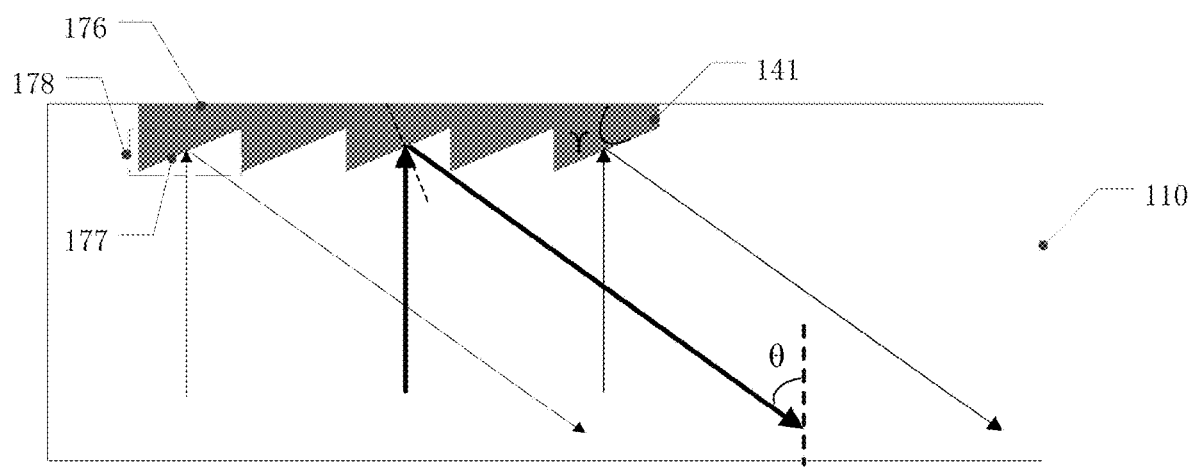
FIG. 5G is another exemplary structural diagram of the second light modulating member of the light source module illustrated in FIG. 5A.

For example, the second light modulating member 142 can also be a blazed grating (for example, a blazed grating illustrated in FIG. 5G). The light source module 100 adopting the blazed grating as the second light modulating member 142 will be described below in connection with FIG. 5G and FIG. 5H. For example, FIG. 5G exemplarily illustrates a blazed grating. For example, as illustrated in FIG. 5G, the blazed grating comprises a plurality of grating grooves, and the blazed angle of each grating groove (that is, the angle between a groove surface of the grating groove and a plane of the blazed grating) is Y. For example, in the case that the blazed angle of the blazed grating is Y=θ/2, the blazed grating can make the transmission angle of at least part of the first modulated light 132 in the light guide member 110 be θ; and at this time, if θ is greater than arcsin(n1/n), the blazed grating can enable at least part of the first modulated light 132 (for example, more than 95%) to satisfy the total reflection condition of the light guide member 110.

Figure 5H:
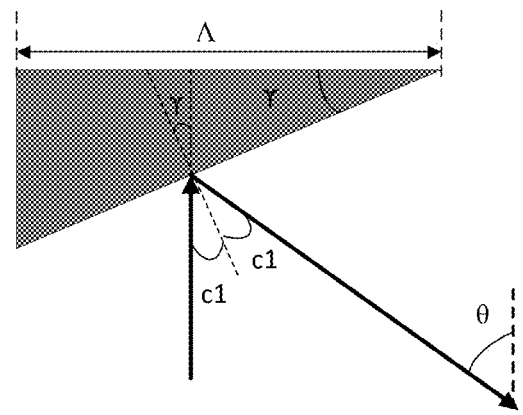
FIG. 5H is a partially enlarged view of a grating groove included in the second light modulating member illustrated in FIG. 5G.

The principle of the blazed grating changing the angle of light will be described below with reference to FIG. 5H. For example, in the case where the first modulated light 132 is perpendicularly incident on the second light modulating member 142 (that is, the first modulated light 132 is perpendicular to the plane of the blazed grating), the angle between the first collimated light 131 and the groove surface is c1=Y. For example, as can be seen from FIG. 5H, c1+c1=θ, and therefore, Y=θ/2. For example, the period Λ and the blazed angle Y of the blazed grating satisfy the grating equation 2Λ×sin=m×Y, where m is the diffraction order and λ is the wavelength of light incident on the blazed grating. For example, in the case where the diffraction principal maximum of the blazed grating is the first order diffracted light, the period of the blazed grating is Λ=λ/(2 sin Y)=(2 sin(θ/2)).

For example, in a case where the second light modulating member 142 of the light source module 100 illustrated in FIG. 5A is a blazed grating, a material for the blazed grating can be selected according to actual requirements, which is not limited in the embodiment of the present disclosure. For example, the blazed grating can be made of a metal material such as aluminum. For example, the blazed grating can have diffraction efficiency greater than 85%. The blazed grating can be manufactured through a suitable preparing method, which comprises photolithography, imprinting, and etc.

For example, the second light modulating member 142 can also be implemented as a step grating, an array of reflective modulating structures, or other suitable light modulating structures capable of changing the direction of incident light, which is not limited by the embodiments of the present disclosure. For example, the step grating can be designed based on the method described in the embodiment illustrated in FIGS. 5D and 5E, and the array of reflective modulating structures can be designed based on the method described in the embodiment illustrated in FIG. 3C, which will not elaborated here.

For example, in the present embodiment, by providing the first light modulating member 141 on the second surface 112 and the second light modulating member 142 on the first surface 111, it can be ensured that the width of the first light modulating member in the first direction D1 is decreased in the case where there is no dark region in the light exiting region 124, thereby increasing the ratio of the area of the light exiting region 124 to the area of the first surface 111, so that the frame of the display device comprising the light source module 100 can be made narrower.

Fourth Embodiment

The present embodiment provides a light source module 100. The light source module 100 can be configured as a light source for a display device. For example, FIG. 6A illustrates a schematic sectional view of a light source module 100 according to the fourth embodiment, FIG. 6B illustrates a schematic sectional view of another light source module 100 according to the fourth embodiment, and FIG. 6C illustrates a schematic sectional view of sill another light source module 100 according to the fourth embodiment.

For example, the light source module 100 according to the fourth embodiment is similar to that of the first embodiment. Only the difference between the present embodiment and the first embodiment will be described, and the common will not be elaborated herein. For example, the light source module 100 can comprise a light guide member 110, a light exiting member 120, a first collimating light source 130, and a first light modulating member 141. For example, the difference of the present embodiment from the first embodiment lies in that the first light modulating member 141 of the light source module 100 according to the fourth embodiment is disposed on the first surface 111.

Figure 6B:
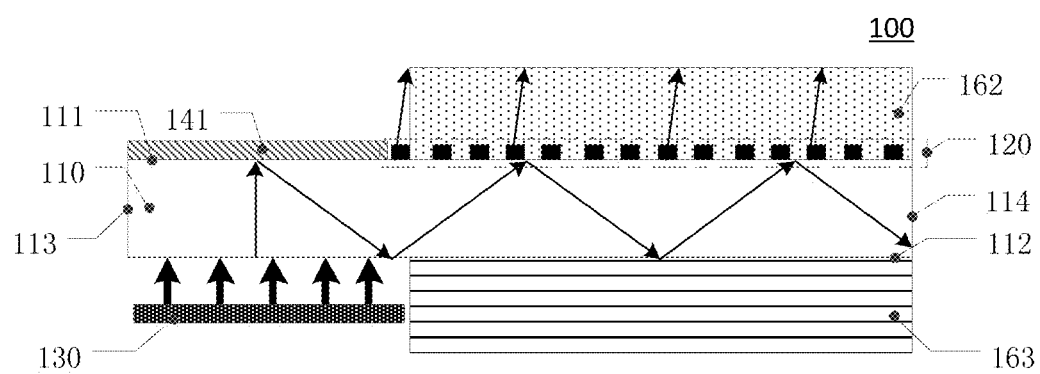
FIG. 6B is a schematic cross-sectional view of another light source module according to a fourth embodiment.
Figure 6C:
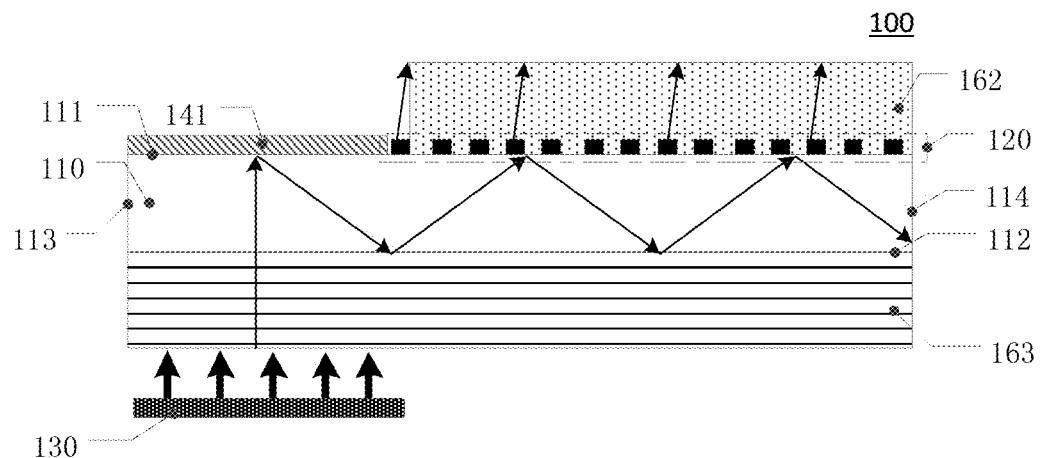
FIG. 6C is a schematic cross-sectional view of still another light source module according to a fourth embodiment.

For example, as illustrated in FIGS. 6A-6C, in the case where the width L of the first light modulating member 141 in the first direction D1 is greater than or equal to 2h×tan θ, there is light (that is, light transmitted in the light guide member 110) incident on any position of the light exiting region 124 of the light guide member 110. Therefore, there is no dark region in the light exiting region 124 of the light source module 100 according to the embodiment of the present disclosure, and thus display effect of a display device comprising the light source module 100 can be improved. Here, θ is the angle between the transmission direction of the light in the light guide member 110 and the normal direction t of the first surface 111, and h is the thickness of the light guide member 110 in a direction perpendicular to the first surface 111.

For example, as illustrated in FIG. 6A, the first collimated light 131 emitted from the first collimating light source 130 can be incident on the light guide member 110 via the first surface 111 (i.e., the light is first incident on the first light modulating member 141 and then incident on the first surface 111). For example, the first collimating light source 130 can be disposed on a side of the first light modulating member 141 away from the light guide member 110, but embodiments of the present disclosure are not limited thereto. For example, the first collimating light source 130 can be perpendicularly incident on the first light modulating member 141 (i.e., parallel to the normal direction of the first surface 111), but embodiments of the present disclosure are not limited thereto.

For example, for the light source module 100 illustrated in FIG. 6A, the first light modulating member 141 can be implemented as a volume grating, an array of reflective modulating structures, a step grating, or other suitable light modulating structure capable of changing the direction of incident light, which is not limited in the embodiments of the present disclosure.

For example, the volume grating can be designed based on the method described in the embodiment illustrated in FIG. 3A and FIG. 3B, and the array of reflective modulating structures can be designed based on the method described in the embodiment illustrated in FIG. 3C, and the step grating can be designed may be based on the method described in the embodiments illustrated in FIG. 5D and FIG. 5E, and details will not be described herein again.

For example, as illustrated in FIG. 6B, the first collimated light 131 emitted from the first collimating light source 130 can be incident into the light guide member via the second surface 112 (i.e., the light is first incident on the second surface 112 and then incident on the first light modulating member 141). For example, as illustrated in FIG. 6B, the first collimating light source 130 can be disposed on a side of the second surface 112 away from the first surface 111, but embodiments of the present disclosure are not limited thereto. For example, the first collimating light source 130 can be perpendicularly incident on the first light modulating member 141 (i.e., parallel to the normal direction of the first surface 111), but embodiments of the present disclosure are not limited thereto.

For example, for the light source module 100 illustrated in FIG. 6B, the first light modulating member 141 can be a volume grating, a blazed grating, an array of reflective modulating structures, a step grating, or other suitable light modulating structure capable of changing the direction of incident light. The embodiments of the present disclosure are not limited thereto.

For example, the volume grating and the blazed grating can be respectively adopt the volume grating and the blaze grating illustrated in FIG. 5F and FIG. 5G; the step grating can be designed based on the method described in the embodiment illustrated in FIG. 5D and FIG. 5E, the array of reflective modulating structures can be designed based on the method described in the embodiment illustrated in FIG. 3C, and details will not be elaborated here.

For example, the light source module 100 illustrated in FIG. 6C is similar to the light source module 100 illustrated in FIG. 6B, except that the width of the second substrate 163 in the first direction D1 is equal to the width of the light guide member 110 in the first direction D1. Thus, the second substrate 163 can better protect the second surface 112, and manufacturing processes for the light source module 100 can be simplified.

For example, in this embodiment, by disposing the first light modulating member 141 on the first surface 111, light emitted from the collimating light source can be incident on the light guide member 110 via the first surface 111, and at least part (for example, more than 95%) of the light incident thereon satisfies the total reflection condition of the light guide member 110, so that light incident on the light guide member 110 can be transmitted to the light exiting region 124 of the light source module 100 and exits the light guide member. For example, by setting the width L of the first light modulating member 141 in the first direction D1 greater than or equal to 2h×tan θ, there is no dark region in the light exiting region 124 of the light source module 100, and thus display effect of a display panel comprising the light source module 100 can be improved.

Fifth Embodiment

The present embodiment provides a light source module 100 which can be configured as a light source for a display device. For example, FIGS. 7A and 7B respectively illustrate a schematic plan view and a schematic cross-sectional view of a light source module 100 according to the fifth embodiment, and FIG. 7B illustrates a schematic cross-sectional view taken along line AA' illustrated in FIG. 7A.

For example, the light source module 100 according to the fifth embodiment is similar to that of the first embodiment, and only the difference of the present embodiment from the first embodiment will be described and the common will not be elaborated. For example, the light source module 100 can comprise a light guide member 110, a light emitting member 120, a first collimating light source 130, a second collimating light source 150, a first light modulating member 141, and a third light modulating member 143. For example, the width L of the first light modulating member 141 and the third light modulating member 143 in the first direction can be greater than or equal to h×tan θ, but embodiments of the present disclosure are not limited thereto.

Figure 7A:
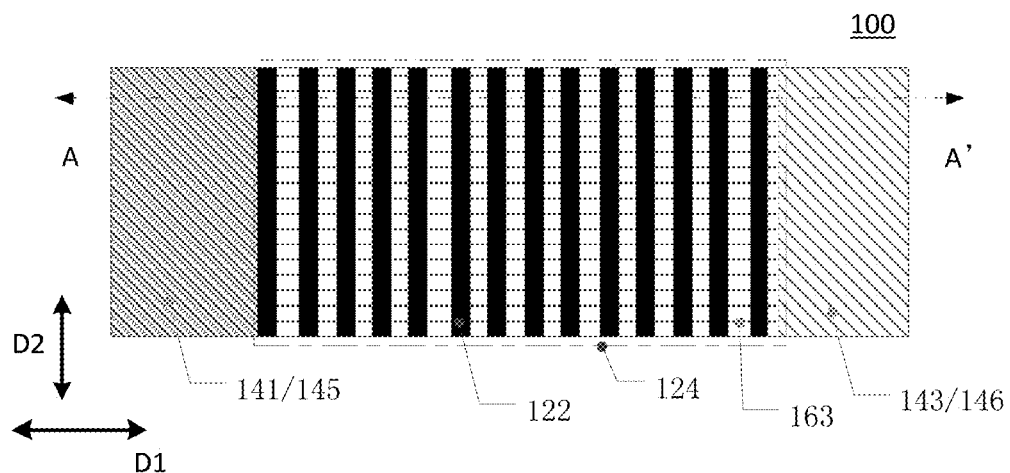
FIG. 7A is a schematic plan view of a light source module according to a fifth embodiment.
Figure 7B:
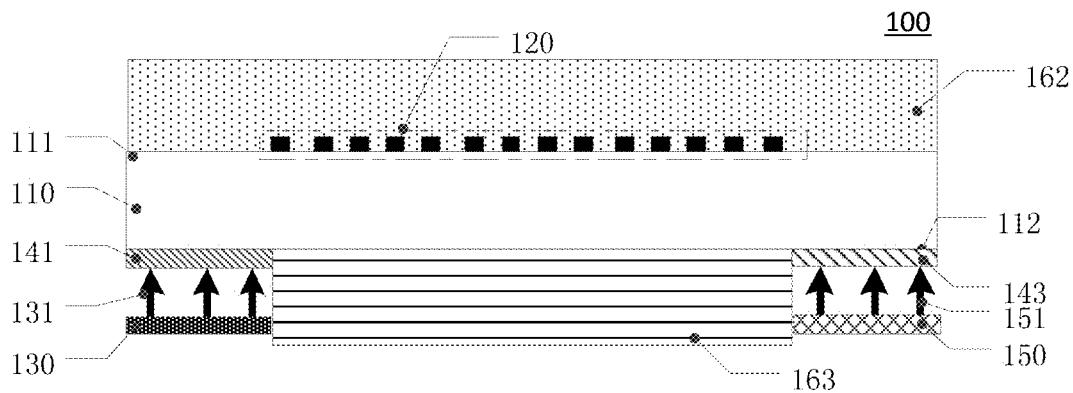
FIG. 7B is a schematic cross-sectional view of the light source module illustrated in FIG. 7A taken along line A-A'.

For example, as illustrated in FIGS. 7A and 7B, the second collimating light source 150 is configured to emit the second collimated light 151. For example, as illustrated in FIGS. 7A and 7B, the third light modulating member 143 can be disposed on the second surface 112, and configured to change the transmission direction of the second collimated light 151 to be incident into the light guide member 110, and such that at least part of the second collimated light 151 satisfies the total reflection condition of the light guide member 110. For example, the arrangement of the second collimating light source 150 and the third light modulating member 143 can refer to the first collimating light source 130 and the first light modulating member 141, respectively, which will not be elaborated herein.

For example, the orthogonal projection of the first light modulating member 141 on the first surface 111 is a first rectangle 145, and the orthogonal projection of the third light modulating member 143 on the first surface 111 is a second rectangle 146, and the first rectangle 145 and the first The two rectangles 146 are respectively located at both ends of the first surface 111 in the first direction D1.

For example, by arranging the first light modulating member 141 and the second light modulating member 142 respectively on the surfaces (for example, the second surface 112) at the two ends of the light guide member 110 in the first direction D1, the light distribution is more uniform in the light guide member, which can further improve the light uniformity of the light exiting region 124 and the light source module 100.

Figure 7C:
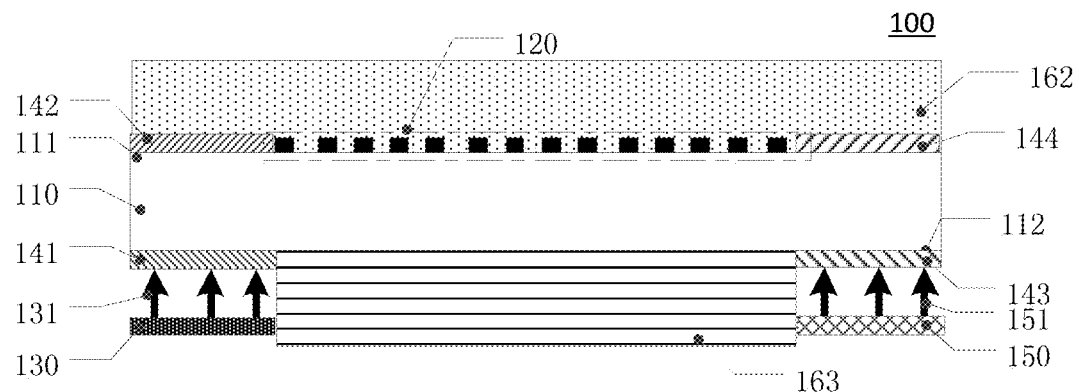
FIG. 7C is a schematic cross-sectional view of another light source module according to the fifth embodiment.

For example, FIG. 7C illustrates a schematic cross-sectional view of another light source module 100 according to the fifth embodiment. The light source module 100 illustrated in FIG. 7C is similar to the light source module 100 illustrated in FIG. 7B, and only differences between the light source module 100 illustrated in FIG. 7C and the light source module 100 illustrated in FIG. 7B will be described here, and the common will not be elaborated.

For example, compared with the light source module 100 illustrated in FIG. 7B, the light source module 100 illustrated in FIG. 7C can further comprise the second light modulating member 142 and the fourth light modulating member 144. For example, the second light modulating member 142 and the fourth light modulating member 144 can be disposed on the first surface 111, and can be disposed opposite to the first light modulating member 141 and the third light modulating member 143, respectively. For example, the width L of the second light modulating member 142 and the fourth light modulating member 144 in the first direction can be greater than or equal to h×tan θ, but embodiments of the present disclosure are not limited thereto.

For example, the first light modulating member 141 can be configured such that the first collimated light 131 incident thereon can be divided into the first modulated light 132 with a constant transmission direction and the second modulated light 133 with a changed transmission direction. For example, the first light modulating member 141 can make the second modulated light 133 satisfy the total reflection condition of the light guide member 110. For example, the first modulated light 132 is perpendicularly incident on the second light modulating member 142; for example, the second light modulating member 142 can make the first modulated light 132 incident thereon satisfy the total reflection condition of the light guide member 110. For example, the intensities of the first modulated light 132 and the second modulated light 133 can be equal to each other to improve the light uniformity of the light source module 100, but the embodiments of the present disclosure are not limited thereto. For example, function of the third light modulating member 143 is similar to that of the first modulating member, and will not be elaborated herein.

For example, for the embodiment illustrated in FIG. 7C, the first collimated light source 130 and the second collimated light source 150 can be disposed with reference to the arrangement of the first collimated light source 130 according to the first embodiment; the first light modulating member 141 (as well as the third light modulating member 143) and the second light modulating member 142 (as well as the fourth light modulating member 144) can be arranged with reference to the arrangement of the first light modulating member 141 and the second light modulating member 142 according to the third embodiment, respectively, and will not be elaborated here.

Figure 7D:
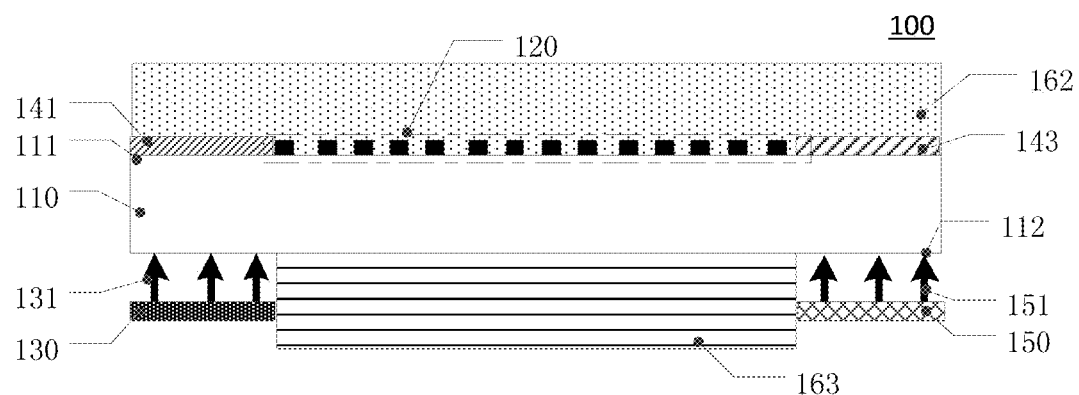
FIG. 7D is a schematic cross-sectional view of still another light source module according to the fifth embodiment.

For example, FIG. 7D illustrates a schematic cross-sectional view of another light source module 100 according to the fifth embodiment. The light source module 100 illustrated in FIG. 7D is similar to the light source module 100 illustrated in FIG. 7B, and only differences between the light source module 100 illustrated in FIG. 7D and the light source module 100 illustrated in FIG. 7B will be described here, and the common will not be elaborated. For example, as compared with the light source module 100 illustrated in FIG. 7B, the first light modulating member 141 and the third light modulating member 143 comprised in the light source module 100 illustrated in FIG. 7D are disposed on the first surface 111. For example, the first light modulating member 141 and the third light modulating member 143 can be arranged with reference to the arrangement of the first light modulating member 141 according to the fourth embodiment, which will not be elaborated.

For example, in the present embodiment, by arranging the first light modulating member 141 and the second light modulating member 142 on the surfaces (for example, the second surface 112) at the two ends of the light guide member 110 in the first direction D1, respectively, the light distribution in the light guide member is more uniform, so that the light emitting uniformity of the light exiting region 124 and the light source module 100 can be further improved, and accordingly, display effect of a display device comprising the light source module can be improved.

Sixth Embodiment

The present embodiment provides a display device 10. For example, FIG. 8A illustrates a schematic diagram of a display device 10 according to the sixth embodiment, and FIG. 8B is an exemplary configuration diagram of the display device 10 illustrated in FIG. 8A. For example, as illustrated in FIGS. 8A and 8B, the display device 10 can comprise the light source module 100 according to any one of the embodiments of the present disclosure. For example, as illustrated in FIG. 8, the display device 10 can further comprise a display panel 210 and a touch panel 220. For example, the light source module 100 can be closer to the user side 230 than the display panel 210. And then, the display device 10 is a front backlight display device.

It should be noted that, for other indispensable components of the display device 10 (for example, an image data encoding/decoding device, a line scanning driver, a column scanning driver, a clock circuit, etc.), applicable conventional components can be used. These should be understood by one of ordinary skill in the art and will not be elaborated herein, and should not be construed as a limit to the present disclosure. The display device 10 can be implemented as a front backlight display device.

It will be apparent to one of ordinary skill in the art that various modifications, variations, and combinations of the disclosed embodiments can be made without departing from the spirit and scope of the disclosure. Thus, if these modifications, variations, and combinations of the embodiments of the present disclosure fall within the scope of the claims of the present disclosure and their equivalent technologies, the present disclosure is also intended to include these modifications and variations.

The foregoing are merely exemplary embodiments of the disclosure, but are not used to limit the protection scope of the disclosure. The protection scope of the disclosure shall be defined by the attached claims.

The invention claimed is:

1. A light source module, comprising a light guide member, a light exiting member, a first collimating light source, and a first light modulating member; wherein
the light guide member comprises a first surface and a second surface disposed opposite to the first surface, the first surface is configured as a light exiting surface and comprise a light exiting region;
the light exiting member is disposed on the first surface in the light exiting region;
the first collimating light source is configured to provide a first collimated light;
the first light modulating member is disposed on one of the first surface and the second surface and configured to change a transmission direction of the first collimated light so as to make the first collimated light incident into the light guide member and make at least part of the first collimated light meet a total internal reflection condition of the light guide member;
L is greater than or equal to k×h×tan θ, wherein L indicates a width of the first light modulating member in a first direction, k represents 1 or 2, θ represents an included angle between a transmission direction of the light in the light guide member and a normal direction of the first surface, and h indicates a thickness of the light guide member in a direction perpendicular to the first surface and wherein θ is configured so that a part of the light in the light guide member incident on the light exiting region is diffracted by the light exiting member and exit the light guide member through the first surface; and
the light exiting member is provided with a plurality of grating sub-structures disposed at intervals in the first direction.

2. The light source module according to claim 1, wherein the first collimated light is perpendicularly incident on the first light modulating member.

3. The light source module according to claim 2, wherein the first light modulating member is disposed on the second surface; and the first light modulating member is at least one of a volume grating, a step grating and a reflective modulating structure array.

4. The light source module according to claim 3, wherein is greater than or equal to 2h×tan θ.

5. The light source module according to claim 3, further comprising a second light modulating member, wherein
the second light modulating member is disposed on the first surface and disposed opposite to the first light modulating member; and
the second light modulating member is at least one of a volume grating, a step grating, a blazed grating and a reflective modulating structure array.

6. The light source module according to claim 5, wherein is greater than or equal to h×tan θ; and
L1 is greater than or equal to h×tan θ;
wherein L1 indicates a width of the second light modulating member in the first direction.

7. The light source module according to claim 5, wherein the first light modulating member is configured to divide the first collimated light incident thereon into a first modulated light of which transmission direction is constant and second modulated light of which transmission direction is changed, intensity of the first modulated light being equal to intensity of the second modulated light.

8. The light source module according to claim 2, wherein
the first light modulating member is disposed on the first surface;
L is greater than or equal to 2h×tan θ,
the first light modulating member is at least one of a volume grating, a step grating, a blazed grating and a reflective modulating structure array.

9. The light source module according to claim 1, wherein the first collimated light emitted by the first collimating light source is a stripe light source.

10. The light source module according to claim 1, wherein each of the plurality of grating sub-structures comprises a first grating bar extending in a second direction or a plurality of second grating bars spaced apart in the second direction, the second direction being perpendicular to the first direction.

11. The light source module according to claim 1, further comprising a reflective member, wherein the light guide member further comprises a first side surface and a second side surface, the first side surface and the second side surface are perpendicular to the first surface and are disposed opposite to each other in the first direction, and the reflective member is disposed on at least one of the first side surface and the second side surface and is configured to reflect light incident thereon back to the light guide member.

12. The light source module according to claim 1, further comprising a third light modulating member and a second collimating light source; wherein
the second collimating light source is configured to provide a second collimated light;
the third light modulating member is disposed on one of the first surface and the second surfaces and configured to change a transmission direction of the second collimated light to be incident into the light guide member so as to make at least a portion of the second collimated light meet a total reflection condition of the light guide member; and
an orthogonal projection of the first light modulating member on the first surface is a first rectangle region, an orthographic projection of the third light modulating member on the first surface is a second rectangle region, and the first rectangle region and the second rectangle region are respectively located at two ends of the first surface in the first direction.

13. The light source module according to claim 1, further comprising a first substrate and a second substrate, wherein
the first substrate is disposed on the light exiting member;
the second substrate is disposed on a side of the light guide member away from the light exiting member; and
each of a refractive index of the first substrate and a refractive index of the second substrate is less than a refractive index of the light guide member.

14. The light source module according to claim 1, wherein
a thickness of the light guide member in a direction perpendicular to the first surface is in a range of 1 µm to 90 µm; and
a refractive index of the light exiting member is identical to a refractive index of the light guide member.

15. A display device, comprising the light source module according to the light source module according to claim 1.

16. The light source module according to claim 1, wherein the first light modulating member is a volume grating, a period, a Bragg angle and an inclined angle of the volume grating being configured to make at least part of the first collimated light meet a total reflection condition of the light guide member.

* * * * *